United States Patent [19]
Brinkley

[11] 4,057,445
[45] Nov. 8, 1977

[54] CLOSED TORUS TIRE
[75] Inventor: Max D. Brinkley, North Canton, Ohio
[73] Assignee: The Goodyear Tire & Rubber Company, Akron, Ohio
[21] Appl. No.: 646,713
[22] Filed: Jan. 5, 1976
[51] Int. Cl.² .................... B29H 15/00; B29H 17/02
[52] U.S. Cl. ................................. 156/121; 152/350; 152/354 R; 156/133; 156/396; 156/400; 156/414
[58] Field of Search .............. 156/110 R, 118–121, 156/122, 123, 124, 133, 394, 414, 415, 420, 396, 126, 111, 400–402; 152/349, 350, 351, 354

[56] References Cited
U.S. PATENT DOCUMENTS

| | | | |
|---|---|---|---|
| 2,047,999 | 7/1936 | Eger | 156/120 |
| 2,090,210 | 8/1937 | Lee | 156/119 |
| 2,372,382 | 3/1945 | Krusemark | 156/119 |
| 2,936,813 | 5/1960 | Haase | 156/126 |
| 2,981,310 | 4/1961 | Frohlich et al. | 156/400 |
| 3,392,072 | 7/1968 | Alderfer | 156/123 |
| 3,485,700 | 12/1969 | Cooper et al. | 156/417 |
| 3,576,693 | 4/1971 | Pacciarini et al. | 156/417 |
| 3,704,189 | 11/1972 | Varga | 156/110 R |
| 3,761,340 | 9/1973 | Klein | 156/111 |
| 3,776,792 | 12/1973 | Grawey | 156/121 |

FOREIGN PATENT DOCUMENTS
731,436  4/1966  Canada .............................. 156/121

*Primary Examiner*—Charles E. Van Horn
*Assistant Examiner*—John E. Kittle
*Attorney, Agent, or Firm*—F. W. Brunner; R. S. Washburn

[57] ABSTRACT

A closed torus tire in which the cord or wire reinforcement ply, or plies, surround the inflation chamber which can retain pressure without being mounted on a wheel. The reinforcement ply is continuous circumferentially of the tire and axially in the crown and sidewalls. The circumferential ply edges are lap-spliced in the inner wheel-engaging part, rather than being folded around bead cores. The tire is made without use of a building core of any kind, thus avoiding the cost and difficulty of removing such core from the completed tire. The tire is made by wrapping the reinforcement ply, or plies, about a cylindrical drum to form a sleeve. An inner liner is then wrapped about the sleeve, a reversal of normal tire building practice. One circumferential edge of the sleeve is then moved outward and axially over the remaining sleeve, beyond the other, unmoved edge. The one edge is then moved inward and axially under the other edge to form the lapped splice.

15 Claims, 10 Drawing Figures

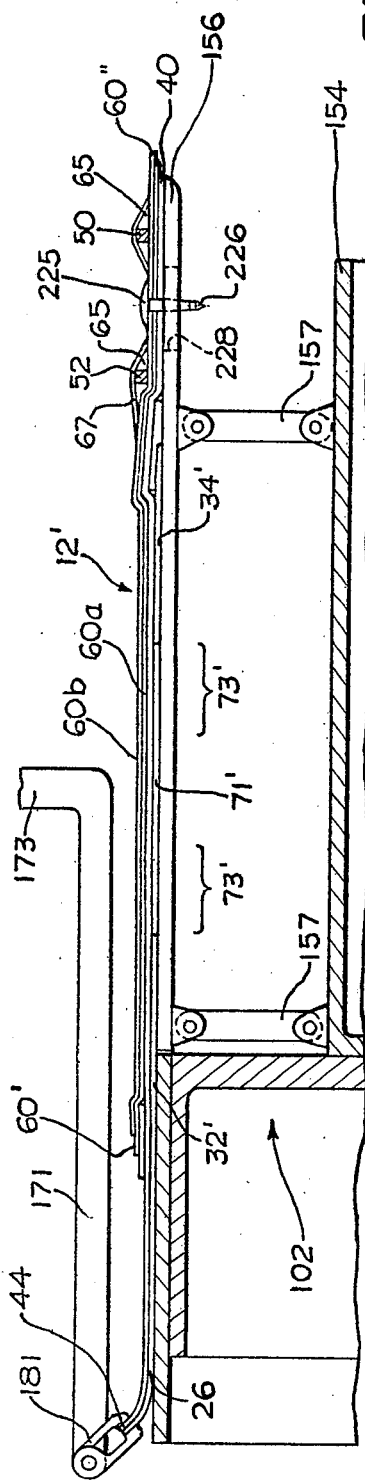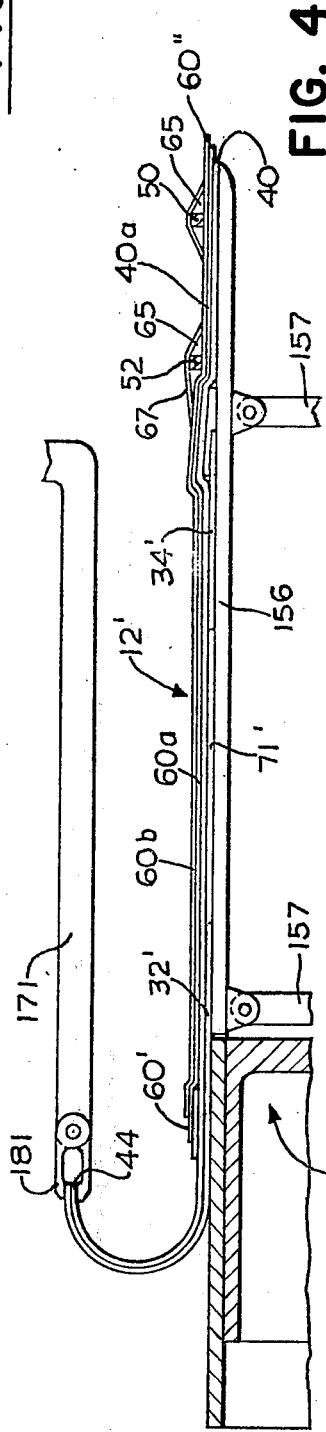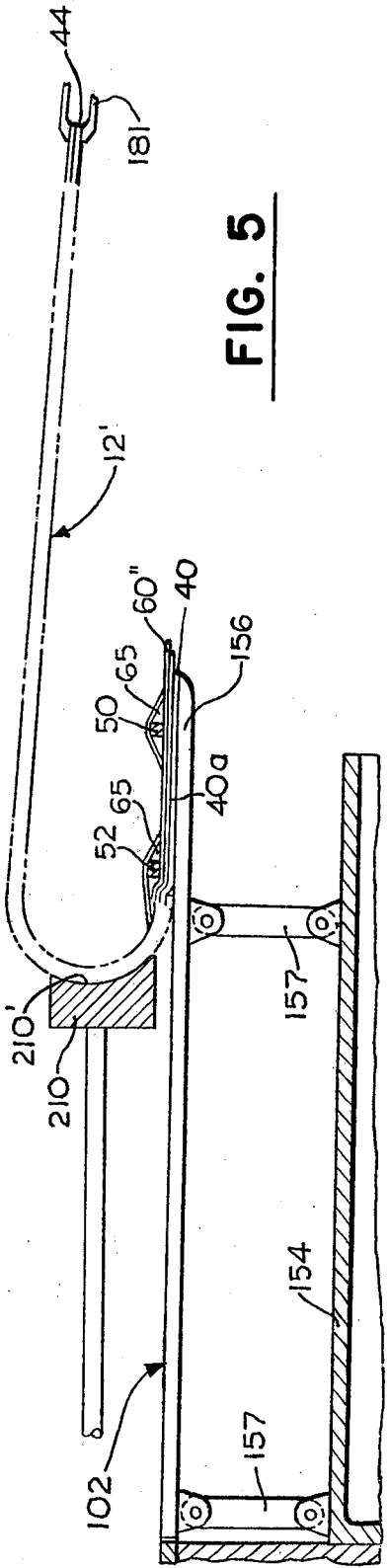

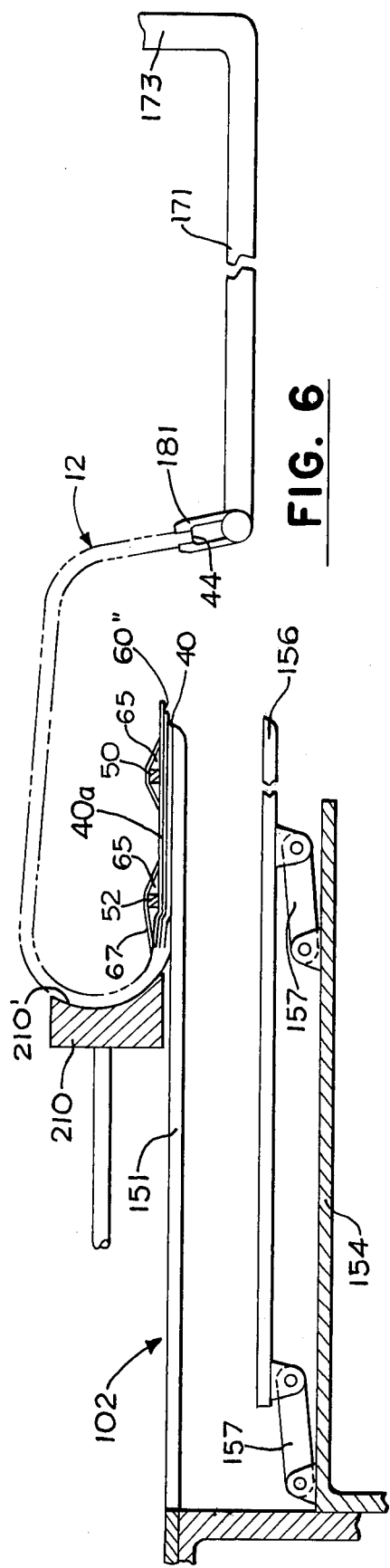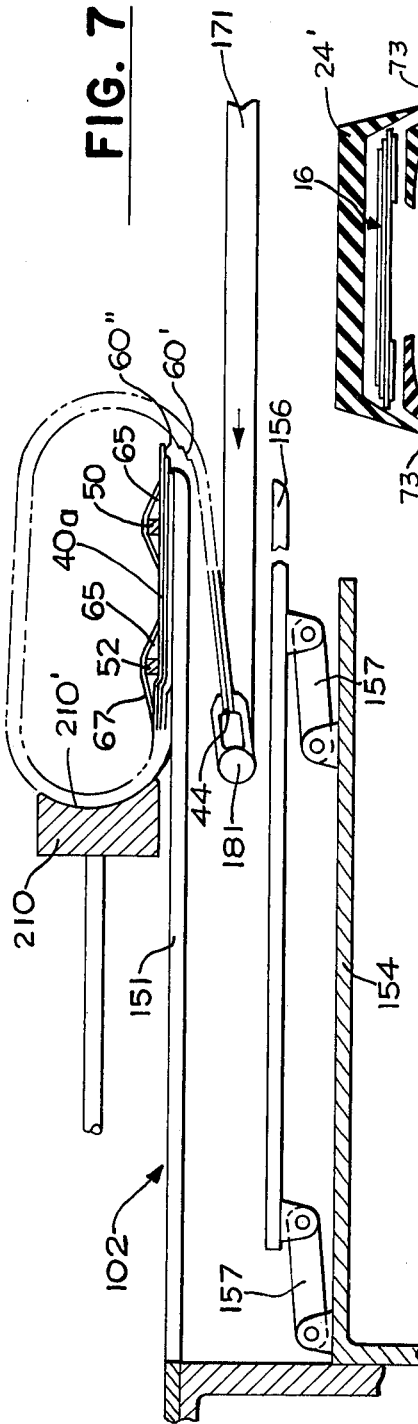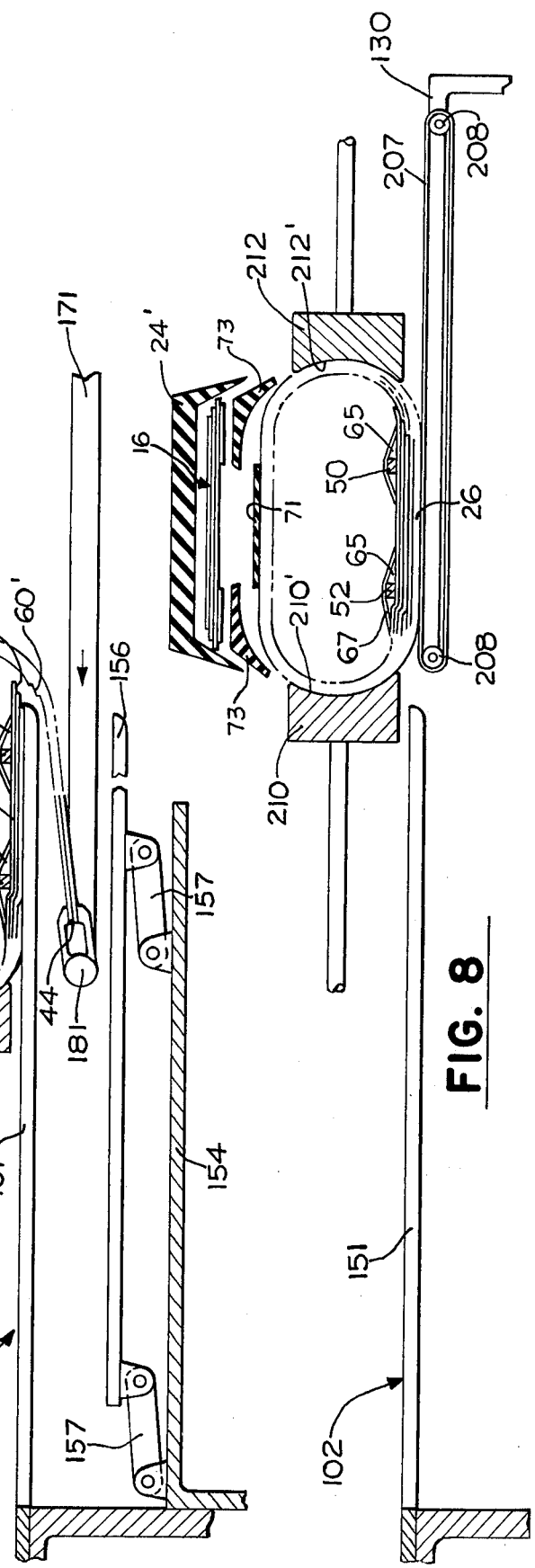

CLOSED TORUS TIRE

The foregoing abstract is not to be taken as limiting the invention of this application, and in order to understand the full nature and extent of the technical disclosure of this application, reference must be made to the accompanying drawings and the following detailed description.

The present invention relates to tires, particularly to the class of tires for heavy duty and requiring inflation pressures of several times normal ambient atmospheric pressure as well as to apparatus for and method of making such tires. Still more particularly the invention relates to a tire having a completely closed torus or toroid inflation chamber capable of retaining pressure therein in excess of atmospheric pressure independently of any wheel on which the tire may be mounted.

Broadly, the tire according to the invention comprises a closed torus inflation chamber fully enclosed by a reinforcement cord ply and comprising a pair of inextensible restraining hoops coaxial with and spaced axially along a tire rotation axis, a cord or wire reinforcement ply surrounding said chamber and said hoops and having a first circumferential edge portion disposed radially inward of and axially through at least one of said hoops and a second circumferential edge portion disposed radially inward of the first edge portion and axially through at least the other of said hoops, said edge portions being lapped one over the other to close said chamber.

An apparatus for building a tire in accordance with the invention comprises a cylindrical building drum having an axis, a plurality of slats extending parallel to and spaced angularly about the axis to define an axially extending space between each circumferentially adjacent pair of slats, a plurality of segments extending parallel to the axis, and each movable radially of the axis in a respective one of the spaces, and means supporting said drum for rotation about said axis; a ply rollover device having a plurality of arms extending coaxially of said drum, a carrier supporting said arms for movement axially of said drum and for movement radially of said axis, a ply grip pivotably mounted on each said arm at the end thereof remote from the carrier; and a cylindrical building form mounted for movement coaxially of said drum for receiving a partially built torus tire coaxially moved relatively thereover from said drum.

Broadly, a method for building a tire in accordance with the invention comprises in combination the steps of: forming a cylindrical sleeve of cord or wire ply stock, disposing a pair of parallel, spaced apart hoops around one circumferential edge portion of the sleeve, moving the other circumferential edge portion of the sleeve radially outwardly and axially over the remaining portion of the sleeve to form and locate a first sidewall portion, then moving said other circumferential edge portion radially inwardly and then axially through said hoops, and disposing the respective edge portions in lapping relation between and within the hoop assemblies, and subsequently curing the tire.

To acquaint persons skilled in the related arts with the principles of the invention certain preferred embodiments, illustrative of the best mode presently contemplated for practicing the same, will be described by and with reference to the drawings forming a part of the present specification and in which drawings:

FIGS. 3-8 are schematic diagrams illustrating the method in accordance with the invention, as well as operation of the apparatus in accordance therewith;

Figure 1:
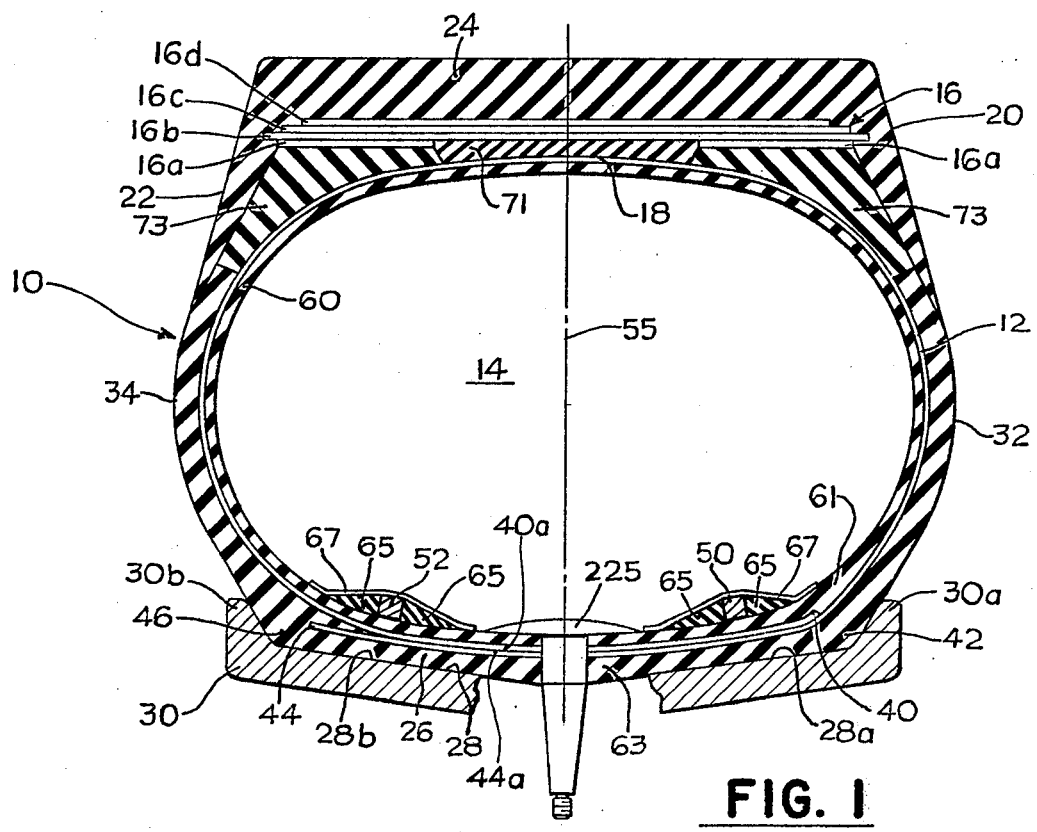
FIG. 1 is an axial cross-section view of a tire in accordance with the invention.

In FIG. 1, a tire 10 in accordance with the invention is illustrated schematically by an axial cross-section of the tire. The present invention is concerned principally with useful and novel arrangements of the cord or wire reinforcing ply or plies 12 in relation to the tire inflation chamber 14. In its practical embodiment the tire has a belt 16 extending circumferentially of the tire, radially outwardly of the inflation chamber and axially across the crown 18 between the shoulders 20, 22. A tread 24 is disposed circumferentially about the crown and extends axially thereacross and is cured integrally with the remainder of the tire. Alternative forms of tread will be discussed at greater length presently.

The inflation chamber 14 is formed as a complete, closed torus. The radially outward circumferential portion, i.e. the crown 18, is connected to a unitary axially extending radially inner part 26, adapted to engage the tire support surface 28 of a wheel 30 by a pair of sidewall portions 32, 34 which extend radially between the wheel-engaging inner part 26 and the crown 18 at the respective sides of the tire. A circumferentially endless ply 12 of wire or cord reinforcement extends from a first circumferential edge 40 near the heel 42 clockwise around the cross-section illustrated in FIG. 1 axially in the wheel-engaging portion, radially outwardly in the first sidewall portion 34, axially across the crown 18, radially inwardly in the second sidewall portion 32 and continuing clockwise terminates in a second circumferentially extending edge 44 near the opposite heel 46. Edge portions 40a, 44a of the ply are lapped one on the other between the planes of the respective edges to form an axially and circumferentially extending lapped splice in the wheel-engaging part 26. The chamber 14 is thus completely enclosed (except for an inflation valve body) about any cross-section thereof.

In a conventional tire the radially inner edges of the respective sidewalls customarily terminate in an annulus thicker than the sidewall which is called a bead and in which bead the carcass plies are anchored to a grommet or bead core formed by one or more inextensible rings. This arrangement provides for mounting the conventional tire on a wheel having axially spaced apart bead seats which accommodate the beads thereon. The tire according to the present invention, having an inflation chamber of toric form and completely closed around any cross-section, does not have beads or bead cores in the sense just described.

It is in the light of the foregoing discussion that the inextensible rings of the tire 10 are referred to in the present disclosure and in the claims as hoops 50, 52. The hoops themselves are formed of one or more wires wound to form the endless ring in a manner identical to the construction of conventional bead cores.

The tire 10 is particularly adapted to cooperate with a wheel 30 the tire support surface 28 of which comprises a pair of cones 28a, 28b converging oppositely toward the mid-circumferential plane 55 of the tire. At the axial extremities of the surface 28 the wheel has flanges 30a and 30b diverging radially and axially outwardly of the respective cones. The roll restraining hoops 50, 52 are disposed within the toroid formed by the ply 12 and are spaced axially of the splice between the respective circumferential edges 40, 44 such that the ply extends axially outwardly through the plane of the respectively associated hoop to each of the edges. It will also be noted that the hoops are spaced inwardly with respect to the associated flanges 30a, 30b. The hoops cooperate with the respectively associated cones of the wheel surface to augment the strength of the splice as well as to limit the extent to which the tire can move or roll laterally of the wheel on which it is mounted when the tread is subjected to a force imposed transversely of its plane of rotation.

To retain an inflating medium in the chamber 14, the tire has an inner liner 60 surrounding the chamber, contiguous to and immediately inward of the ply 12. The liner is formed of two gum layers 60a, 60b. One, two, or more layers of gum can be used. As will be described in more detail presently, the circumferentially extending edges of the liner are joined along a circumferential area 61 adjacent the edge 40 of the ply. Thus, the chamber is entirely closed and capable of retaining inflation pressure whether or not the tire is mounted on a wheel.

The cord or wire reinforcement ply 12 of the tire 10 is a single ply in which parallel cords or wires are disposed normal to the mid-circumferential plane 55 of the tire which is also the plane of rotation of the tire. It is also contemplated within the scope of the invention that the ply can be provided as a pair of individual plies each having cord or wire reinforcements which in the respective plies form acute angles oppositely disposed with respect to the plane 55.

The ply 12 extends from its first circumferential edge 40 continuously about the chamber to the other circumferentially extending edge 44. It is a circumferentially endless band the edge portions 40a, 44a of which are lapped one on the other in the radially inner wheel-engaging part 26 of the tire, which part is least subject to flexure in the operation of the tire. In the sidewalls and crown of the tire, the reinforcement cords are continuous and unbroken. Thus, the tire develops the advantages theoretically attributable to tires made by continuously helically winding a single cord or groups about the cross-sections around the tire while at the same time providing a tire capable of being made without resort to any rigid core therewithin for the support of such winding operation. The circumferential edge portions 40a, 44a of the ply are lapped one on the other and form a circumferentially and axially extending splice in the wheel-engaging inner part 26 of the tire. Both of the edge portions extend axially through at least one and preferably both of the hoops 50, 52 each portion extending in a direction opposite of the other portion.

The hoops cooperate with the tire support surface 28 of the wheel to secure the lapped edge portions one to the other thus enhancing the operative strength of the lapped splice. The wheel-engaging part also includes an inner wall pad 63 which extends axially between and is joined integrally with the respective sidewalls 32, 34 to form the heels 42, 46 which conform to the respective flanges 30a, 30b. When the tire is mounted on the wheel 30 the lapped ply portions 40a, 44a tend to be compressed between the tire supporting surface 28 and the respective hoops 50, 52.

As may be seen in FIG. 1, the respective edges 40, 44 each terminate axially outward of the plane of the respectively associated hoop 50, 52. It is, however, contemplated within the scope of the invention that a single hoop of suitable axial width can be employed at or close to the mid-circumferential plane of the tire. Alternatively, a spacer (not shown) may be provided between the hoops to prevent their moving axially toward each other. It is further contemplated that one or both of the respective edges of the ply can be arranged to extend each through one hoop only of the tire such that the respective edges of the ply lap one over the other and terminate at spaced locations axially between the respective hoops. It is, however, believed that this is a less desirable construction.

Associated with each hoop are a pair of filler strips 65 disposed on respectively opposite sides of each hoop to integrate the hoop and the underlying innerliner. Each hoop and its associated filler strips are overlaid with a circumferentially extending cover strip 67 insulating the hoops and maintaining the integrity of the inflation chamber. Each strip is of gum rubber compatible with the liner and when cured becomes an integral part of the liner.

In the tire 10 the belt 16 comprises four individual circumferentially extending plies 16a, 16b, 16c, 16d. The first, 16a, and radially innermost ply of the belt is in two parts each of which extends axially outward of a breaker center strip 71 and overlies a circumferentially extending shoulder wedge 73 which accommodates the differences in transverse curvature between the belt 16 and the torus formed by the ply. The several belt plies are of cord or wire ply stock of conventional construction and materials selected in accordance with conventional practice and not within the scope of the present invention.

The sidewall portions 32, 34 include outer layers of gum rubber extending circumferentially of and radially outward from the wheel-engaging pad 63 to the shoulder wedges 73 to protect the ply 12. To cover the respective circumferential edges 40, 44 and to conform the wheel-engaging part 26 to the wheel support surface 28, additional gum strips are also incorporated in the tire. The circumferential length of the belt 16, in any tire according to the invention, restricts the diametral expansion of the torus chamber.

Figure 9:
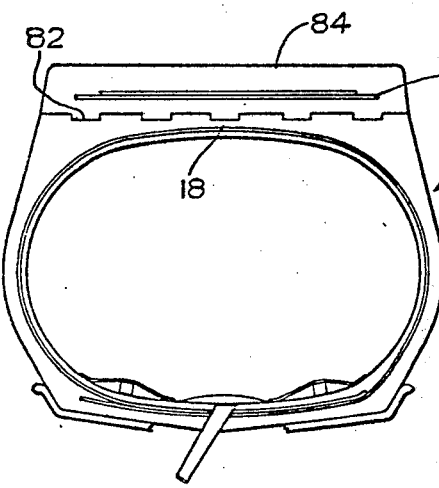
FIGS. 9 and 10 are axial cross-section views of alternative forms of the tire in accordance with the invention.

Alternative forms of tread which were previously referred to and which are contemplated within the scope of the invention include for example the tire illustrated in FIG. 9. The tire 80 is identical with the tire 10 with the exception that the tread portion 24 is omitted prior to the cure of the remainder of the tire or, alternatively, is removed subsequent to such cure. The crown 18 is provided with a plurality of circumferentially extending grooves 82. An endless tread 84 having an inextensible belt 86 extending circumferentially and axially therein is formed and cured apart from the tire. This tread is provided with circumferentially extending ridges 88 adapted to cooperate with the grooves 82 to secure the tread in place on and as a part of the tire. The tread 84 is mounted circumferentially about the crown so as to become for practical purposes an integral part of the tire.

Figure 10:
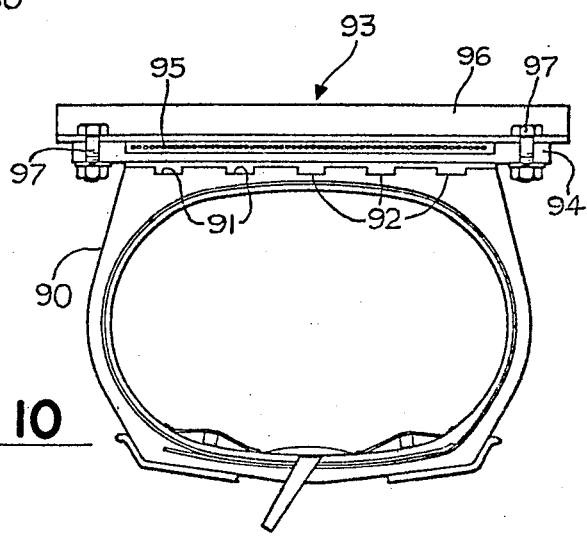

Referring to FIG. 10, the tire 90 is also identical to the tire 10 with the exception that the tread 24 is either omitted prior to curing the rest of the tire or is removed subsequently. In the crown 18 of the tire, circumferentially extending grooves 91 are provided which are adapted to receive circumferentially extending ridges 92 in an endless inextensible tread assembly 93 cured apart from the tire and mounted on the tire in a manner similar to that described in connection with FIG. 9. The tread assembly 93 incorporates therewithin a multiplicity of transverse retainer bars 94 disposed in closely spaced sequence circumferentially about the tire, and endless circumferentially extending belt 95 disposed radially outward of the bars 94 and within the tread. The ground-contacting surface of the tread assembly is provided by a plurality of grouser bars 96 one of which is attached to each of the bars 94 at the respectively axially outward protruding ends thereof by the bolts 97.

Heretofore, building a tire having a completely closed torodial air chamber completely surrounded by reinforcing cord ply has been difficult and expensive. Common practice heretofore has required a rigid core, having the configuration of the desired air chamber, about which the tire can be built. Such core had to be of a disintegratable material capable of being reduced to a fluent state to be removed through the inflation valve opening. In accordance with the present invention, a method and apparatus for building the tire described hereinabove are provided. One particular object of the invention is the production of the tire without resort to a rigid core of any character for building the tire.

Figure 2:
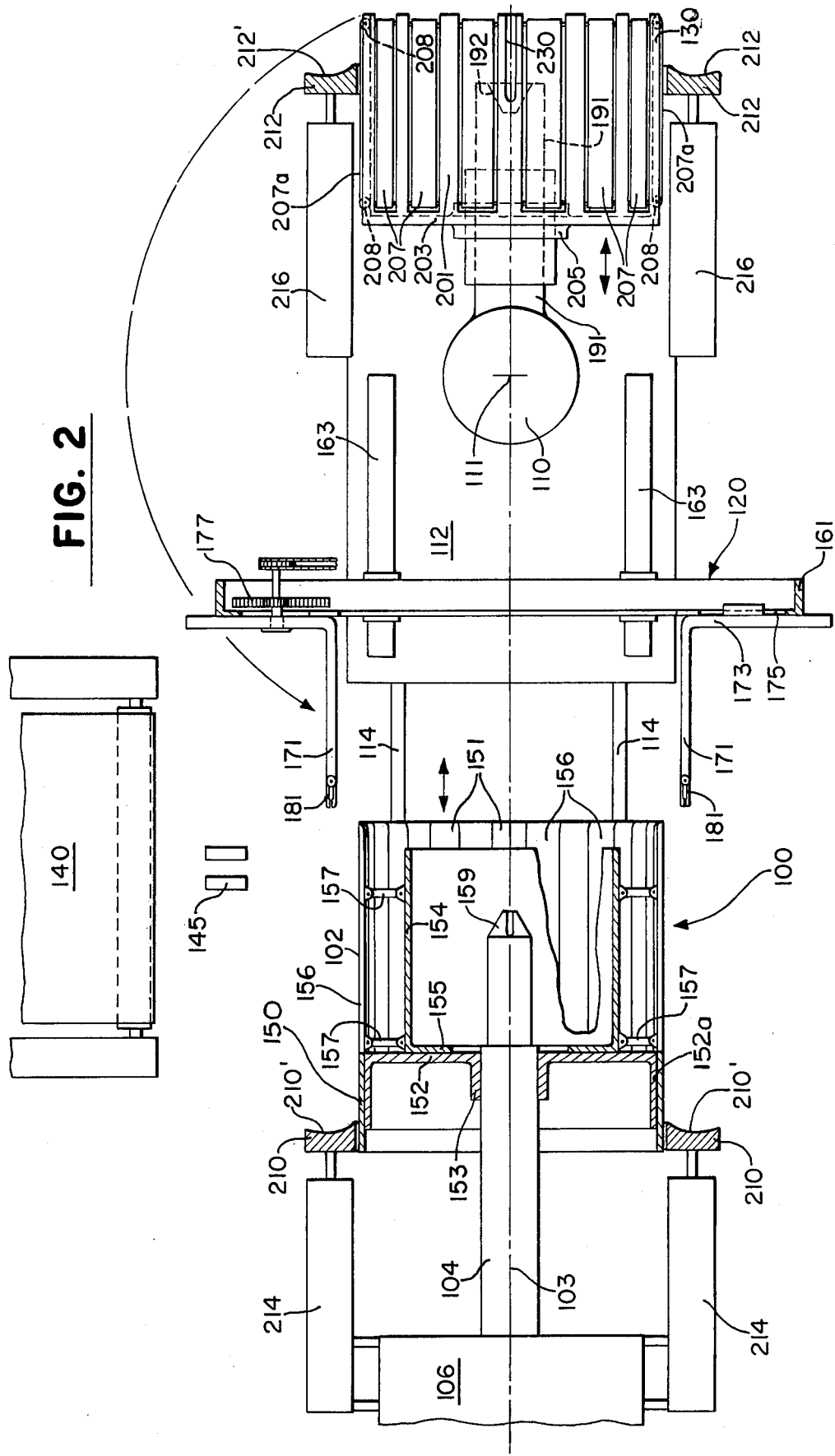
FIG. 2 is a schematic plan view of an apparatus for building the tire of FIG. 1 in accordance with the invention, portions thereof being broken away to show interior features of the apparatus.

In FIG. 2, there is shown schematically a plan view of an apparatus 100 in accordance with the invention. The apparatus comprises a cylindrical building drum 102 having a rotational axis 103. Means for supporting the drum for rotation about the axis is provided by shaft 104 which is supported for rotation as well as for axial movement by suitable bearings located within the housing 106. A turret 110 is mounted for rotation about an axis 111 perpendicular to the axis 103 on a base 112 which is provided with track means 112 for moving the base and the turret in directions parallel to the drum axis 103. A ply rollover device 120 and a cylindrical building form 130, both presently to be described in greater detail, are mounted on the turret.

A suitable servicer 140 is preferably provided to deliver tire building components to the building form 102 and to the building form 130 at different stages in the operation. Also provided is a stitching mechanism 145. Neither the servicer nor the stitching mechanism are within the scope of the present invention and hence are not further described.

The drum 102 comprises an outer cylindrical shell 150 which is secured coaxially to the flange 152a of a support disc 152 having a hub 153 secured coaxially to the shaft 103. A second shell 154 coaxial and radially inward of the shell 150 is fixed to the disc 152 by a radially inwardly turned flange 155 and supports a segment actuating mechanism represented by the plurality of pairs of links 157. Also included in the drum is an extension of the center shaft 104 providing a pilot 159.

The shell 150 is slotted axially at arcuate intervals to form a plurality of slats 151 extending axially outwardly from the disc 152. The radial thickness of the shell and particularly of the slats 151 is preferably small, sufficient only to support the tire without undue deflection of the slats. An axially extending segment 156 occupies the space between each respectively adjacent pair of slats. The plurality of segments can be moved radially toward and away from the axis 103 by the segment actuating mechanism referred to. In its radially outer position, each segment 156 lies flush with the cylindrical surface of the shell 150 and slats 151 and cooperates in providing a relatively uninterrupted cylindrical building surface. The segments can be provided with means (not shown) engaging and supporting the slats while the segments are in their radially outward positions to minimize the deflection of the slats.

The ply rollover device 120 comprises a carrier in the form of a ring 161 capable of being moved coaxially over the drum 102. The ring is mounted slidably on the base 112 by a pair of rails 163 extending parallel to the drum axis, which provide slide means for supporting the rollover device for movement coaxially of the drum. As will now be apparent the carrier can, alternatively, be moved coaxially over the drum by and with the turret base which is also mounted slidably for movement parallel to the drum axis.

The rollover device 120 comprises a plurality of axially extending arms 171 each of which is attached to or integral with a radially extending slide member 173 slidable in a corresponding radially extending way 175 formed in the ring 161. Movement of the arms radially of the axis 103 in timed relation with one another can readily be provided by simple rack and pinion mechanism 177 associated with each slide member, the pinions being driven by sprockets connected by an endless chain. Numerous equivalent mechanisms will be readily apparent to persons skilled in the art.

A ply grip 181 is pivotally mounted on each of the arms 171 at the end thereof remote from the carrier ring 161. Each grip is pivoted to swing in a plane containing the axis 103 and preferably to swing through an arc of about 270 degrees or more. Each grip is capable of engaging the edge 44 of the ply 12 in the manner presently to be more fully explained. While the plurality of grips 181 can be arranged for remote mechanical operation, in the present apparatus a simple spring clamp is preferred.

The cylindrical building form 130 is mounted on a cantilever shaft 191 extending from the turret 110 oppositely from the rollover device 120 and coaxially with respect to the drum axis. The form can be moved coaxially along its shaft. The arrangement is such that by rotating the turret 180° the ply rollover device 120 is swung away from its operating position adjacent the building drum 102 while the building form 130 is simultaneously moved into a coaxial operating relation with the building drum 102. When the form 130 is positioned in axial alignment and juxtaposed to the building drum 102, the socket 192 in the end of the shaft 191 is engaged with the pilot 159 to maintain the coaxial alignment as well as to rotate the building form. Alternatively, the form can be moved axially toward and away from the building drum by and with the movement of the base which provides for slide means supporting the form for movement coaxially of the drum. The building form comprises an outer cylindrical shell 201 coaxial with the shaft 191 and fixed on a web 203 having a hub 205 corotatable with and slidable along the shaft 191. Glide means facilitating relative coaxial movement between the form 130 and a partially built tire thereon are provided by a plurality of belts 207 each having an outer reach 207a extending and slidable along the underlying surface of the shell 201 parallel to its axis. Together, the belt reaches 207a provide a major part of the cylindrical surface of the form. Each belt 207 is trained about two small rollers 208 so that the return run of the belt is disposed radially beneath the shell 201.

To control the axial location of a partially built or incomplete tire being built in the apparatus, a first control ring 210 is associated with the drum 102 and a second control ring 212 is associated with the building form 130. As will presently appear, the two control rings are cooperable to fix the axial position of the partially built tire therebetween. The first control ring closely surrounds the drum and its surface 210' extends radially outward from the drum surface sufficiently to engage the sidewall of the tire in process both inward and outward radially of its maximum axial section width. The tire engaging surface 210' of the ring is, therefore, curved suitably to accommodate the curve of the tire sidewall. The ring is mounted coaxially of the drum and is supported for relative axial movement with respect to the cylindrical surface of the drum. Movement of the ring in the axial direction is effected by a pair of cylinders 214 which are mounted on the drive housing 106.

The second control ring 212 in like manner closely surrounds the building form 130 and its annular surface 212' extends radially outwardly from the cylindrical surface of the form sufficiently to control the location of the nearer sidewall of the tire in process both radially inward and outward of its maximum axial section width. The contact surface 212' of the ring is also curved to accommodate the curve of the tire sidewall. The ring is mounted for relative axial movement with respect to the building form and the axial movement and position of the ring is effected by a pair of cylinders 216 which are mounted on the turret base 112.

It will be apparent now that the ply rollover device can, with only minor modifications, be arranged to move axially beyond the drum 102 or the form 130 when not in active use. Moreover, the form 130 can also be arranged in its operating coaxial relation with the drum 102 and mounted on the axially slidable base 112 omitting the turret 110 and its rotation function.

FIGS. 3 through 8 illustrate schematically the successive steps in the method of building a tire in accordance with the invention, as well as the operation of the apparatus thus far described. In general, the method comprises in combination the steps of forming a cylindrical sleeve 12' of cord or wire ply stock, disposing the pair of parallel spaced apart hoops 50, 52 circumferentially about one edge portion 40a of the sleeve, then moving the opposite edge 44 of the sleeve radially outwardly and axially over the remaining portion of the sleeve to form and to locate a first sidewall portion. The movement of the edge 44 is then continued to move the edge portion 44a radially inwardly and then axially through the one edge 40 and the hoops 50, 52. This motion then disposes the second edge portion 44a in a lapping relation with the first edge portion 40a, the slats 151 of the drum being temporarily disposed between the lapped portions.

The operation further includes disposing a parallel pair of sidewall elements 32', 34' in endless cylindrical form spaced axially of each other about the cylindrical surface of the drum 102 before disposing the sleeve 12' of ply stock therearound. Subsequent to the formation of the sleeve, the gum stock liner 60 is disposed in adhering relation around and along the sleeve, the respective axial edges 60', 60" of the liner being so disposed that during the formation of the torus these edges become located relatively of one another to form a circumferential splice therebetween in the region 61 (FIG. 1).

To provide for inflating the completed tire, an inflation valve body 225 is inserted before the edge portions 40a, 44a of the ply 12 are lapped one on the other. The partially completed tire can be inflated, by way of the valve body to provide support of the ply surrounding the chamber in lieu of a rigid core. An endless breaker belt whose circumferential length is such as to restrict the diametral expansion of the chamber is subsequently disposed about the crown of the partially completed tire.

Referring again to FIG. 2, the building drum 102 and the rollover device 130 are moved axially, to the right as seen in FIG. 2, to dispose the building drum in suitable alignment relative to the servicer 140. As will presently appear, this alignment differs from the familiar prior art arrangement in that the mid-axial plane of the drum is not coincident with the mid-circumferential plane 55 of the tire. The drum and servicer having been suitably coaligned relative to one another conveniently to supply to the drum the successive tire components, and the segments moved to their radially outward position as shown, the sidewalls 32' and 34' are wrapped first about the drum.

Optionally, at this stage, element 73' for forming the shoulder wedges 73 may be applied to the drum generally in the areas indicated. Other components required by a specific tire design may be added in appropriate axial locations along the drum. Notably differing from the prior art, such elements are applied to the cylindrical building surface before the ply is laid up thereon rather than later as in conventional tire building procedure.

The single radial reinforcing ply 12 is then wrapped about the drum to form the circumferentially continuous sleeve 12' extending from its first circumferential edge 40, which corresponds to the previously discussed circumferential edge in the tire and which edge is located adjacent the outboard end of the drum, to the other circumferential edge 44, which corresponds to the edge 44 discussed in connection with the tire 10 which is located near the inboard end of the drum.

Two plies of gum stock 60a, 60b forming the innerliner 60 are next successively wrapped about the sleeve 12'. The axial length of the liner on the drum corresponds to the peripheral length thereof about the crosssection of the tire 10 as illustrated in FIG. 1, the respective edges 60', 60" being located so as to become joined, as will presently appear, in a circumferential splice near the radially inward end of the sidewall 32.

Each element successively applied about the drum is located axially thereof in accordance with its intended position in the tire 10 as measured on the periphery of the cross-section of the tire from the first axial edge 40 of the ply 12.

It should be noted that the lay-up of the tire building elements is in a conspicuously different sequence from the lay-up of a tire in accordance with the practice of the prior art. For example, the liner 60 is applied over the ply 12 which is in turn applied over the belt center strip 71' of the crown 18, as well as, optionally, over the shoulder wedges 73'.

Next, the two hoops 50, 52 are disposed closely around the liner 60 axially inward of the circumferential edge 40, at axial spacings commensurate with the spacings therefrom in the tire 10. The filler strips 65 are then wrapped about the drum snugly adjacent to the respective hoops thereby fixing the hoops with respect to the liner. The cover strips 67 are wrapped about the drum to overlie the respective hoops and filler strips.

The inflation valve body 225 is provided with a temporarily attached penetrator 226 and is then inserted through the liner 60 and the ply portion 40a between the hoops 50, 52. The penetrator makes it possible readily to force the valve body through the sleeve 12 by locally displacing the cords or wires thereof immediately adjacent the valve body. That part of the valve body which extends radially inward of the ply is accommodated in an opening 228 through one of the segments 156 so that when the segments are moved radially inward the valve does not impede removal of the tire axially from the drum. Alternatively, the opening 228 can be extended axially of the segments and open to the outboard end of the drum.

The ply sleeve, as well as the other components, are suitably consolidated by stitching during and following the lay-up of the components on the drum by the conventional stitchers 145 in the conventional manner.

When the sleeve and the associated components have been assembled on the drum and suitably consolidated by stitching, the surface of the liner 60, and of the cover strips 67, axially inward of the edges 60', 60'' are made non-tacky by application of zinc stearate or an equivalent. The ply rollover device 130 is moved coaxially of and over the drum 102 to position the ply grips 181 closely adjacent the circumferential edge 44 of the ply at the inboard end of the drum. The arms 171 are moved radially inwardly closely adjacent to the sleeve 12' in the manner indicated in FIG. 3. The ply grips 181 are oriented to engage directly with the ply edge 44 which is raised from the drum surface either manually or otherwise to permit the grips to be operated to grasp the edge 44.

To move the edge 44 radially outwardly and then axially over the remaining portion of the sleeve, as indicated in FIGS. 4 and 5, the arms 171 are moved radially outwardly from the drum while the carrier ring 161 is moved axially, toward the right as seen in the figures. The movement generates a configuration in the sleeve which in crosssection as illustrated in FIG. 4 is approximately a semicircle. The ply edge 44 is carried in a continuous movement by grips of the ply rollover device continuously to the stage illustrated in FIG. 5. The first sidewall control ring 210 is then brought into engagement with the sidewall 34' by extending the rods of the cylinders 214 to control the location of the sidewall relatively of the mid-circumferential plane 55.

When the ply edge 44 has been moved axially to the extreme position illustrated in FIG. 5, the segments 156 are moved to their radially inward positions and the arms 171 moved radially inwardly, as indicated in FIG. 6. The grips rotate and then move the edge 44 radially inwardly to a radius less than the radius of the cylindrical surface of the slats 151. The tire in this stage is supported entirely on the slats and, as illustrated in FIG. 7, the rollover device is moved axially toward the left as seen in the figure so that the ply edge 44 is moved axially through the hoops and radially beneath the slats. The edge 44 is thereby positioned at or close to its final axial location and the respective edges of the liner brought into conjunction. At this stage, the edges of the liner are spliced together and the ply 12 is temporarily adhered to the slats. As the edge portion 44a comes into lapping relation with the portion 40a, the penetrator 226 spreads two adjacent cords or wires to accommodate the valve body 225. The portion 44a can be slit between the cords, if desired, while still in flat cylindrical form to ease entry of the valve body. The ply grips 181 are released from the edge 44.

After the grips are released, the two lapping portions 40a, 44a are adhered one to another, between the slats, by mainpulating the arms 171 of the rollover device outwardly in the spaces between the slats. Alternately, the rollover device can be moved axially away from the drum and the two lapping ply portions be consolidated by raising the segments 156 to press the radially inner ply portion 44a outward into adherent contact with the radially outer ply portion 40a.

After the ply edge grips 181 have been released and the ply rollover device 130 moved axially away from the drum, the turret 110 is rotated to bring the building form 130 into operative coaxial relation with the drum 102 and the second sidewall control ring 212 is moved to engage and to fix the location of the sidewall 32 as may be seen in FIG. 8.

It will be observed that at the present stage in the process the slats 151 are disposed radially between the respective ply portions.

To remove the slats from between the respective ply portions the two control rings 210, 212 are maintained in their spaced relation, as seen in FIG. 8, fixing the axial position of the partially completed tire, while the drum 102 and form 130 are moved coaxially of the tire thereby withdrawing the slats from between the ply portions and transferring the tire from the drum to the building form. The building form is sufficiently smaller in diameter than the drum to accommodate the wheel-engaging pad 26 and the ply portion 44a now disposed radially inward of the first ply portion. The valve body 225 during the transfer of the tire from the drum to the form moves axially in the slot 230 provided therefor in the shell 201 of the building form. The relative axial movement between the partially completed tire and the building form is facilitated by the belts 207 which cooperate to form a major part of the cylindrical surface of the form. The outer reach 207a of each belt can slide readily on the underlying surface of the form and provide glide means for facilitating the relative movement. Alternatively, the surface of the form may be treated with a suitable lubricant to facilitate the axial relative movement between the form and the partially completed tire.

To complete the tire, the building drum 102 and the building form 130 are both moved coaxially toward the housing 106, to the left in FIG. 2, to align the form 130 and the servicer 140 relatively of one another. The chamber 14 is then inflated sufficiently to provide support. The elements forming the shoulder wedges 73 can be wrapped about the partially completed tire in their appropriate axial locations. The breaker belt 16 and the tread 24 can be disposed around the tire in any known manner.

The term rubber in the present specification in the common generally accepted sense will be understood to mean compounds of natural and/or synthetic materials used in making tires. Gum rubber, or gum, will be understood to mean uncured rubber alone and distinguished from ply stock which will be understood to mean tire building material in sheet or strip form having an array of cords, cables, wires or the like in combination with overlying gum rubber.

In the present specification, the terms cord and cords, are used generically and are to be understood as meaning filaments of textile materials for glass fibers or wire in monofilament or multiple strand form, twisted, plied or cabled. In short, any of the diverse linear reinforcement filamentary components known and used in tires.

Torus and toroid properly used describe surfaces or solids generated by revolving a plane closed figure about an axis lying in the plane of the figure and outside its boundary. It is common in arts related to inflatable tires to refer to any tire as a torus or toroid. In the present specification, the terms closed torus and closed toroid are used and intended to distinguish from open torus tires having spaced apart beads and radially inwardly open cross-sections, thus being incapable of containing pressure. Closed torus tire and closed toroid tire as used herein will be understood to mean a tire providing a completely closed inflation chamber capable alone, without being mounted on a wheel, of containing pressure therewithin higher than the surrounding atmospheric pressure.

A tire in accordance with the present invention is capable of retaining high internal pressures without thereby imposing large stresses in the flanges of the wheel on which the tire is mounted. It has been proposed to gain this advantage by wrapping single or small groups of cords helically continuously about the cross-section perimeter so as to form a single ply or successively a plurality of plies having closed torus or toroidal form. This procedure has the disadvantage of requiring a rigid core about which the cord or cords can be wound and which core then must be dissolved or disintegrated and washed out from the inflation chamber by way of the inflation valve. On the other hand, in accordance with the present invention an axially and circumferentially continuous splice is formed in the radially inner part of the closed torus which part engages the wheel on which it is mounted. The splice thus formed can develop nearly the full strength of the cords forming the ply and its integrity is insured by the pressure within the chamber acting to press the inner part and the splice against the tire engaging surface of the wheel. The splice so located also has the advantage of being positioned in the part of the tire least subject to flexure in operation.

The tire can be built by apparatus and methods in accordance with the invention without resort to a rigid core of any description, hence there is no necessity either for providing the rigid core or for removing the same after the tire has been built.

While certain representative embodiments and details have been shown for the purpose of illustrating the invention, it will be apparent to those skilled in the art that various changes and modifications may be made therein without departing from the spirit or scope of the invention.

What is claimed is:

1. The method of building a tire having a toric inflatable chamber comprising in combination the steps of: forming a cylindrical sleeve including a ply of cord or wire ply stock, disposing a pair of parallel spaced apart inextensible hoops around one circumferential edge portion of the sleeve, moving the other circumferential edge portion of the sleeve radially outwardly and axially over the remaining portion of the sleeve to form and to locate a first sidewall of said tire, then moving said other circumferential edge portion radially inwardly of said one edge portion and axially through at least one of said hoops, and then disposing said other circumferential edge portion in lapping and contacting relation with and radially inwardly of said one edge portion thereby to at least initiate between the respective edge portions a splice closing said toric inflatable chamber with said splice being disposed circumferentially of said chamber in the radially inward region of the tire and subsequently curing the tire.

2. The method of building a tire as claimed in claim 1, further comprising, before disposing said hoops, applying a gum stock liner in adhering relation, around and along said sleeve.

3. The method as claimed in claim 2, additionally comprising, prior to lapping said edge portions, inserting an inflation valve body through the first said edge portion of said sleeve.

4. The method as claimed in claim 3, further comprising pressurizing said chamber and disposing thereabout an endless breaker belt of circumferential length such as to restrict the diametral expansion of said chamber.

5. The method as claimed in claim 1, further comprising disposing a parallel pair of sidewall elements in endless cylindrical form spaced axially from each other and inward axially of the respectively associated edge portions of said sleeve and subsequently disposing said sleeve around said sidewall portions.

6. A method as claimed in claim 5, including applying a gum stock liner circumferentially about said sleeve and stitching said liner, said sidewalls, and said sleeve to form a composite assembly including said sleeve prior to moving said other edge portion thereof.

7. Apparatus for building a closed torus tire comprising:
a cylindrical building drum having an axis and having a plurality of radially fixed slats extending parallel to and spaced angularly about the axis to define an axially extending space between each circumferentially adjacent pair of such slats, and having a plurality of segments extending parallel to the axis and each movable radially of the axis from a position occupying a respective one of the spaces to a radially inward position defining an open unobstructed annular space radially outward of the segments and radially inward of the slats;
means supporting said drum for rotation about said axis;
ply rollover means for rolling a ply sleeve edge axially over the remainder of the sleeve having a plurality of arms extending coaxially of said drum, said rollover means including a carrier supporting said arms for movement axially of said drum and for movement radially of said axis;
each said arm having a ply grip pivotally mounted thereon at the end thereof remote from said carrier to swing through an arc of 270°, or more, while gripping said edge; and
a cylindrical building form disposed in coaxial spaced relation with respect to said building drum and means mounting said building form for movement thereof coaxially of said drum to a predetermined proximate relation with said drum such as to enable the direct coaxial transfer of a partially built and closed torus tire carcass from said tire building drum to said form.

8. Apparatus as claimed in claim 7, including first slide means supporting said rollover device for movement coaxially of said drum.

9. Apparatus as claimed in claim 7, including second slide means supporting said form for movement coaxially of the drum.

10. Apparatus as claimed in claim 7, including turret means having a turret axis perpendicular to the first said axis and supporting said rollover device and said second form for angular movement about the turret axis for selectively positioning said device and said second form in operative coaxial alignment with said drum.

11. Apparatus as claimed in claim 10, including track means supporting the turret means for movement parallel the first said axis.

12. Apparatus as claimed in claim 7, including a first side control ring disposed coaxially about the drum and movably coaxially therealong.

13. Apparatus as claimed in claim 12, including a second side control ring disposed coaxially about the form and movable coaxially therealong, said second side support ring being cooperable with said first side support ring to fix the axial position of a partially built tire therebetween.

14. Apparatus as claimed in claim 7, said building form comprising glide means for facilitating relative coaxial movement of the partially built torus tire and the form with respect to one another.

15. Apparatus as claimed in claim 14, said glide means comprising a plurality of belts each having an outer reach extending parallel to the axis of said drum, and together providing a major part of the cylindrical surface of said form, each said reach being movable axially of the form in response to relative axial movement between the form and the partially built tire thereon.

* * * * *

UNITED STATES PATENT AND TRADEMARK OFFICE
CERTIFICATE OF CORRECTION

PATENT NO. : 4,057,445
DATED : November 8, 1977
INVENTOR(S) : Max D Brinkley

It is certified that error appears in the above-identified patent and that said Letters Patent are hereby corrected as shown below:

Column 3, line 46, "a single cord or groups about the"

should read:

-- a single cord or group of cords about the --.

Signed and Sealed this

Twenty-first Day of February 1978

[SEAL]

Attest:

RUTH C. MASON
Attesting Officer

LUTRELLE F. PARKER
Acting Commissioner of Patents and Trademarks